US010280846B2

(12) United States Patent
Sakakibara et al.

(10) Patent No.: US 10,280,846 B2
(45) Date of Patent: May 7, 2019

(54) VALVE OPENING AND CLOSING TIMING CONTROL DEVICE

(71) Applicant: AISIN SEIKI KABUSHIKI KAISHA, Kariya-shi, Aichi-ken (JP)

(72) Inventors: Toru Sakakibara, Kariya (JP); Yuji Noguchi, Obu (JP); Takeo Asahi, Kariya (JP); Hiroyuki Hamasaki, Obu (JP); Tomohiro Kajita, Kariya (JP); Hideyuki Suganuma, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 118 days.

(21) Appl. No.: 15/266,164

(22) Filed: Sep. 15, 2016

(65) Prior Publication Data
US 2017/0002749 A1    Jan. 5, 2017

(30) Foreign Application Priority Data

Dec. 2, 2015 (JP) .................................. 2015-235840

(51) Int. Cl.
*F01L 1/34* (2006.01)
*F02D 13/02* (2006.01)
*F01L 1/344* (2006.01)

(52) U.S. Cl.
CPC ........ *F02D 13/0219* (2013.01); *F01L 1/3442* (2013.01); *F01L 2001/34469* (2013.01);
(Continued)

(58) Field of Classification Search
CPC ........... F01L 1/3442; F01L 2001/34453; F01L 2001/34483; F01L 2001/34469; F02D 13/0219
(Continued)

(56) References Cited

U.S. PATENT DOCUMENTS 6,039,016 A    3/2000 Noguchi
8,887,677 B2 * 11/2014 Boese ................... F01L 1/3442
                                                  123/90.17
(Continued)

FOREIGN PATENT DOCUMENTS

DE    10 2012 208 283 A1    11/2012
JP         11-132014 A         5/1999
(Continued)

OTHER PUBLICATIONS

Extended European Search Report dated Apr. 12, 2017, by the European Patent Office in corresponding European Patent Application No. 16187575.2-1603. (10 pages).

*Primary Examiner* — Ching Chang
(74) *Attorney, Agent, or Firm* — Buchanan Ingersoll & Rooney PC

(57) ABSTRACT

A valve opening and closing timing control device includes: a driving-side rotating body synchronously rotated with a crankshaft of an engine and having a lid member fixed in a direction of the rotational axis; a driven-side rotating body integrally rotated with a camshaft for opening and closing a valve on the same rotational axis; a lock mechanism having a lock member moving in the direction and a lock recessed portion formed inside the lid member and into which the lock member is able to be fitted; and a torsion spring disposed outside the lid member and exerting a biasing force to the driving-side and driven-side rotating bodies, wherein a restricting projection portion for restricting a movement of the torsion spring in the direction is formed in the lid member.

14 Claims, 6 Drawing Sheets

(52) U.S. Cl.
   CPC . *F01L 2001/34483* (2013.01); *F01L 2250/02* (2013.01); *Y02T 10/18* (2013.01)

(58) Field of Classification Search
   USPC .......................................... 123/90.15, 90.17
   See application file for complete search history.

(56) References Cited

U.S. PATENT DOCUMENTS

| | | |
|---|---|---|
| 9,267,401 B2 | 2/2016 | Noguchi et al. |
| 2013/0233263 A1 | 9/2013 | Kinouchi |
| 2014/0069361 A1 | 3/2014 | Watanabe |
| 2016/0108769 A1 | 4/2016 | Kobayashi et al. |
| 2016/0290180 A1 | 10/2016 | Asahi et al. |

FOREIGN PATENT DOCUMENTS

| | | |
|---|---|---|
| JP | 2009-180148 A | 8/2009 |
| JP | 2013-185459 A | 9/2013 |
| JP | 2014-47778 A | 3/2014 |
| WO | 2015/079961 A1 | 6/2015 |
| WO | 2015/141096 A1 | 9/2015 |

* cited by examiner

VALVE OPENING AND CLOSING TIMING CONTROL DEVICE

CROSS REFERENCE TO RELATED APPLICATIONS

This application is based on and claims priority under 35 U.S.C. § 119 to Japanese Patent Application 2015-235840, filed on Dec. 2, 2015, the entire contents of which are incorporated herein by reference.

TECHNICAL FIELD

This disclosure relates to a valve opening and closing timing control device including a torsion spring that displaces a relative rotational phase between a driving-side rotating body and a driven-side rotating body by a biasing force in a predetermined direction.

BACKGROUND DISCUSSION

As a valve opening and closing timing control device, a technique including a torsion spring for biasing a driven-side rotating body with respect to a driving-side rotating body in an advancing direction is disclosed (for example, JP11-132014A (Reference 1) and JP2013-185459A (Reference 2)).

In the valve opening and closing timing control device of Reference 1, a torsion spring is disposed between a front plate of the driving-side rotating body and the driven-side rotating body. A posture of the torsion spring is stabilized by forming a spiral groove on a contact surface of the front plate being that is in contact with the torsion spring along a winding angle of a first turn of the torsion spring.

In the valve opening and closing timing control device of Reference 2, a bottomed cylindrical bush exposed on a front surface side of the driving-side rotating body is fixed to the driven-side rotating body and the torsion spring is housed in the bush. An end portion of the torsion spring extends radially outside and is engaged with a pin-like hook fixed to the front plate. In addition, a plurality of ribs protruding radially inside the bush are provided and the ribs abut against the torsion spring. Therefore, a posture of the torsion spring is corrected such that a center axis of the torsion spring and a rotational axis of the driven-side rotating body are parallel to each other.

In the valve opening and closing timing control device of Reference 1, it is possible to stabilize the posture of the torsion spring by forming the spiral groove on the front plate, but processing is complicated and there is room for improvement.

In addition, as in Reference 2, if the configuration, in which the plurality of ribs are provided radially inside the bush, is provided, when the torsion spring is contracted in diameter, there is a concern that the torsion spring may be inclined in a direction of the rotational axis until abutting against the ribs. As a result, the driving-side rotating body and the driven-side rotating body will be relatively inclined and thereby smooth relative rotation inhibited and device performance decreased. In addition, strength is required for the hook and the front plate, and a size of the device is likely to be increased so as not to move the pin-like hook with which the end portion of the torsion spring is engaged.

SUMMARY

Thus, a need exists for a valve opening and closing timing control device which is not suspectable to the drawback mentioned above.

A feature of a valve opening and closing timing control device according to an aspect of this disclosure resides in that the device includes a driving-side rotating body that is synchronously rotated with a crankshaft of an internal combustion engine and has a lid member fixed in a direction of the rotational axis; a driven-side rotating body that is integrally rotated with a camshaft for opening and closing a valve on the same rotational axis; a lock mechanism that has a lock member moving in the direction of the rotational axis and a lock recessed portion which is formed inside the lid member and into which the lock member is able to be fitted; and a torsion spring that is disposed outside the lid member and exerts a biasing force to the driving-side rotating body and the driven-side rotating body, in which a restricting projection portion for restricting a movement of the torsion spring in the direction of the rotational axis is formed to protrude from a side opposite to the lock recessed portion in the lid member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments of this disclosure will be described with reference to the drawings. However, this disclosure is not limited to the following embodiments and various modifications are able to be provided within the scope not departing from the gist of thereof.

Basic Configuration

Figure 1:
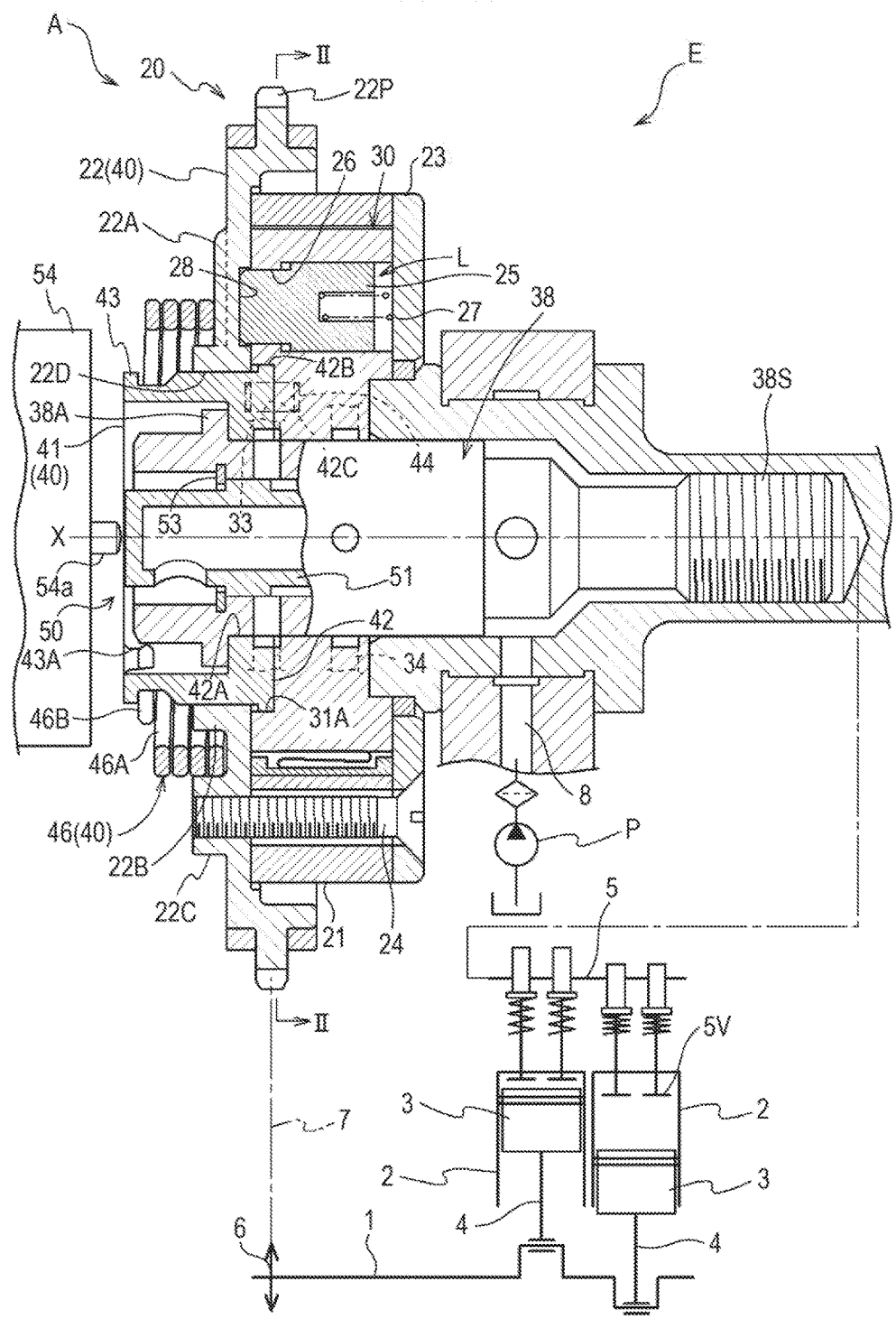
FIG. 1 is a sectional view of a valve opening and closing timing control device.
Figure 2:
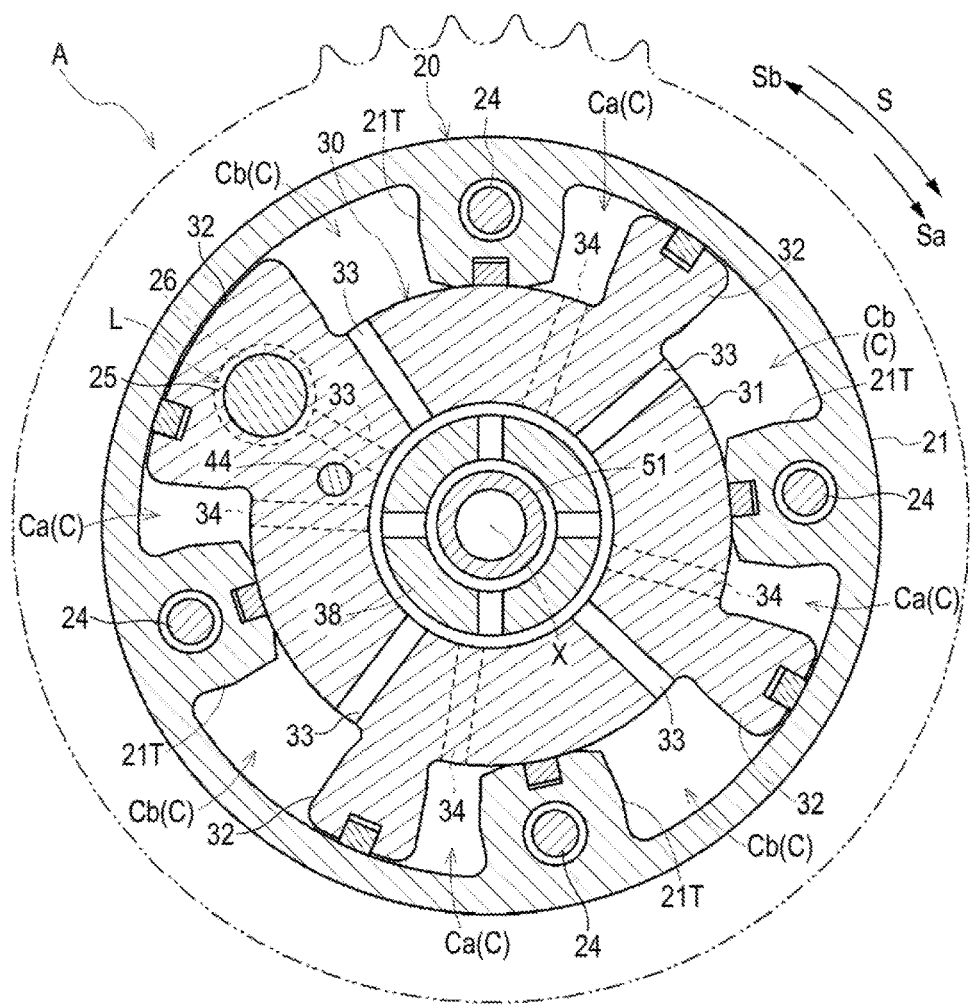
FIG. 2 is a sectional view that is taken along line II-II of FIG. 1.

As illustrated in FIGS. 1 and 2, a valve opening and closing timing control device A is configured to include an outer rotor 20 as a driving-side rotating body, an inner rotor 30 as a driven-side rotating body, a biasing unit 40 as a biasing mechanism for biasing a relative rotational phase between the outer rotor 20 and the inner rotor 30 in an advancing direction, and an electromagnetic control valve 50. Moreover, the biasing unit 40 may bias a relative rotational movement in a reverse direction and is not specifically limited.

The outer rotor 20 (an example of the driving-side rotating body) is linked with a crankshaft 1 of an engine E as an internal combustion engine via a timing chain 7 so as to be synchronously rotated with the crankshaft 1, and is disposed on the same axis as a rotational axis X of an intake camshaft 5. The inner rotor 30 (an example of the driven-side rotating body) is included in the outer rotor 20 by being disposed on the same axis as the rotational axis X and is connected to the intake camshaft 5 so as to be integrally rotated.

The valve opening and closing timing control device A includes the electromagnetic control valve 50 in the same axis as the rotational axis X of the inner rotor 30. The valve opening and closing timing control device A changes the relative rotational phase between the outer rotor 20 and the inner rotor 30 by control of a hydraulic oil (an example of fluid) by the electromagnetic control valve 50 and thereby performing control of an opening and closing timing of an intake valve 5V. Moreover, the outer rotor 20 and the inner rotor 30 function as a phase control mechanism.

The engine E (an example of internal combustion engine) is included in a vehicle such as an automobile. The engine E includes the crankshaft 1 in a lower portion thereof, houses a piston 3 on an inside of a cylinder bore formed in a cylinder block 2 in an upper portion thereof, and is configured of a four-cycle type in which the piston 3 and the crankshaft 1 are connected via a connecting rod 4.

Moreover, as a transmission configuration for transmitting a rotational force of the crankshaft 1 to the valve opening and closing timing control device A, a timing belt type may be used or a configuration of transmitting a driving force of the crankshaft 1 by a gear train having a plurality of gears may be used.

In addition, the intake camshaft 5, an exhaust camshaft, and a hydraulic pump P that is driven by the driving force of the crankshaft 1 are provided in the upper portion of the engine E. The intake camshaft 5 operates the intake valve 5V to be opened and closed by rotation. The hydraulic pump P supplies lubricating oil stored in an oil pan of the engine E on the electromagnetic control valve 50 via a supply flow passage 8 as the hydraulic oil.

The outer rotor 20 is synchronously rotated with the crankshaft 1 by winding a timing chain 7 over an output sprocket 6 formed in the crankshaft 1 of the engine E and a timing sprocket 22P. Even through not illustrated in the figures, a timing sprocket is also provided in a front end of the exhaust camshaft and the timing chain 7 is also wound around the timing sprocket.

Moreover, in the embodiment, the valve opening and closing timing control device A is included in the intake camshaft 5, but the valve opening and closing timing control device A may be included in the exhaust camshaft, or may be included in both the intake camshaft 5 and the exhaust camshaft.

As illustrated in FIG. 2, in the valve opening and closing timing control device A, the outer rotor 20 is rotated by the driving force from the crankshaft 1 in a drive rotation direction S. In addition, a direction in which the inner rotor 30 is relatively rotated with respect to the outer rotor 20 in the same direction as the drive rotation direction S is referred to as an advancing direction Sa, and a reverse direction thereof is referred to as a retarding direction Sb.

Valve Opening and Closing Timing Control Device

Figure 5:
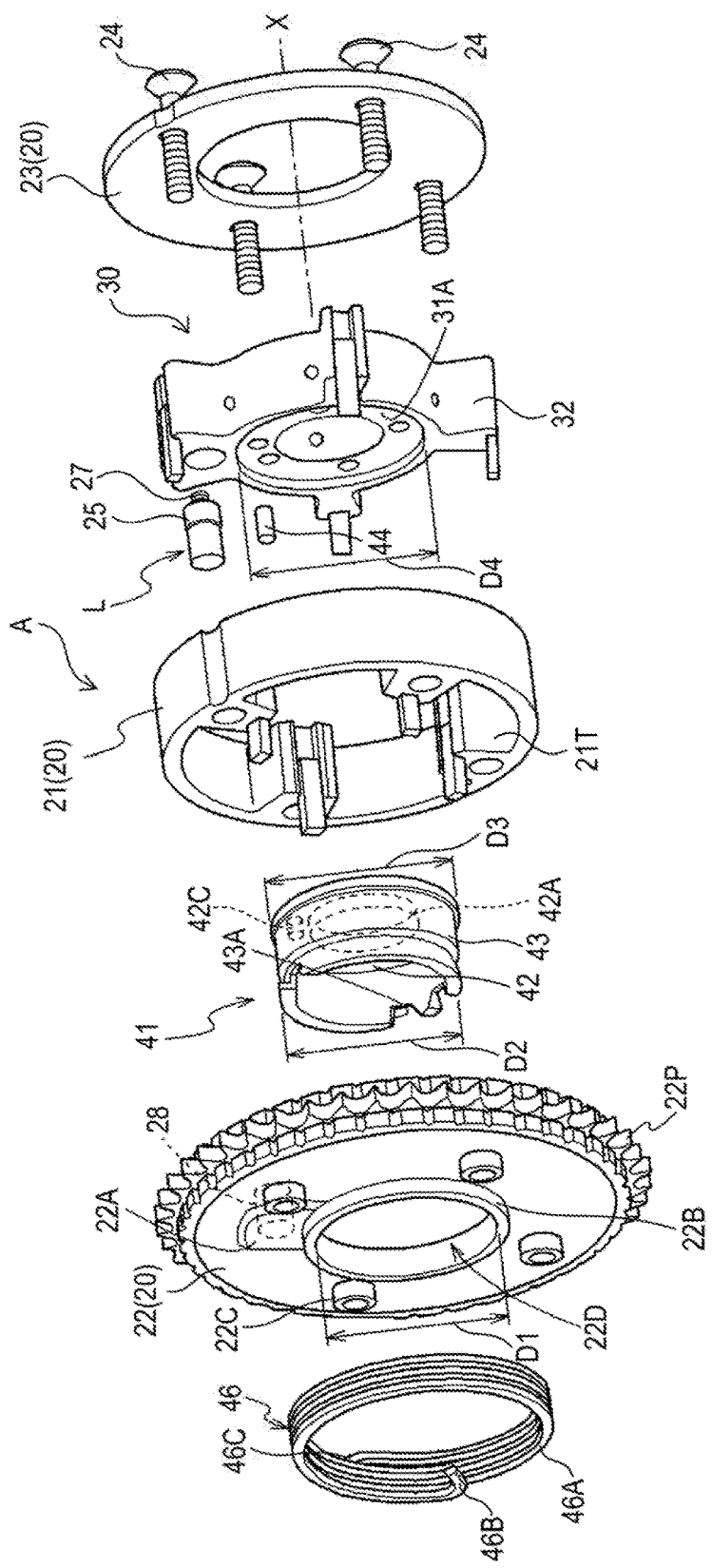
FIG. 5 is an explanatory perspective view of the valve opening and closing timing control device.

The valve opening and closing timing control device A includes, as illustrated in FIGS. 1, 2, and 5, the outer rotor 20 and the inner rotor 30. Moreover, a bush-like intermediate member may be provided in a position which is interposed between the inner rotor 30 and the intake camshaft 5.

The outer rotor 20 has an outer rotor body 21, a lid member 22, and a rear plate 23, and these members are fixed by fastening a plurality of fastening bolts 24. The timing sprocket 22P is formed in an outer periphery of the lid member 22. Moreover, the timing sprocket 22P may be formed in an outer periphery of the rear plate 23, or the outer rotor body 21 and the lid member 22, or the rear plate 23 may be integrally formed in a cup shape.

The outer rotor body 21 is disposed in a position that is interposed between the lid member 22 and the rear plate 23. A plurality of compartment portions 21T protruding inside the outer rotor body 21 in the radial direction based on the rotational axis X are integrally formed.

The inner rotor 30 has a cylindrical inner rotor body 31 that is in close contact with a protruding end of the compartment portion 21T of the outer rotor body 21 and a plurality (four) of vane portions 32 protruding to an outer periphery of the inner rotor body 31 so as to be in contact with an inner peripheral surface of the outer rotor body 21. Moreover, the vane portions 32 are not limited to four and can be set to any number.

Therefore, a plurality of fluid pressure chambers C are formed on an outer periphery side of the inner rotor body 31 in an intermediate position between adjacent compartment portions 21T in a rotating direction. That is, the fluid pressure chambers C, which supply and discharge the hydraulic oil, are formed between the outer rotor 20 and the inner rotor 30. Then, the fluid pressure chambers C are partitioned by the vane portions 32 and thereby an advanced angle chamber Ca and a retarded angle chamber Cb are formed.

In addition, as illustrated in FIG. 1, a bolt head portion 38A and a male threaded portion 38S are formed in a connecting bolt 38 and the male threaded portion 38S is screwed into a female threaded portion of the intake camshaft 5. Therefore, the inner rotor 30 is connected to the intake camshaft 5. Particularly, during connecting, the inner rotor 30 and a seat portion 42 of a spring holder 41 which is described later are integrated in a state of being interposed between the connecting bolt 38 and the intake camshaft 5. Therefore, a fastening force of the connecting bolt 38 does not directly act on the inner rotor 30 and it is possible to prevent deformation of the inner rotor 30.

The connecting bolt 38 is cylindrically formed around the rotational axis X and a spool 51 of the electromagnetic control valve 50 and a spool spring (not illustrated) urging the spool 51 in a protruding direction are housed in an inner space thereof. A configuration of the electromagnetic control valve 50 will be described later.

The valve opening and closing timing control device A includes a lock mechanism L that locks a relative rotational phase between the outer rotor 20 and the inner rotor 30 as a phase control mechanism in the most advanced angle phase. As illustrated in FIGS. 1 and 2, the lock mechanism L includes a lock member 25 that is moved while being guided to a guide hole 26 formed with respect to one vane portion 32 in a posture along the rotational axis X, a lock spring 27 that protrudes and biases the lock member 25, and a lock recessed portion 28 that is formed in the lid member 22. That is, the lock member 25 is moved in the direction of the rotational axis X and the lock recessed portion 28 is formed on an inside of the lid member 22 fixed in the direction of the rotational axis X in the outer rotor 20. Moreover, the lock mechanism L is not limited to a lock mechanism that is locked in the most advanced angle phase and, for example, a mechanism having a structure that is locked in the most retarded angle phase or in any position between the most retarded angle phase and the most advanced angle phase may be provided.

During operation of the engine E, a variable torque acting from the intake camshaft 5 acts in the retarding direction Sb. For this reason, a biasing direction of the biasing unit 40 is set to be displaced with respect to the inner rotor 30 in the advancing direction Sa so as to suppress the action of the variable torque. A configuration of the biasing unit 40 will be described later.

Valve Opening and Closing Timing Control Device: Oil Passage Configuration

As illustrated in FIGS. 1 and 2, a space in which the relative rotational phase is displaced in the advancing direction Sa by supplying the hydraulic oil is the advanced angle chamber Ca and, in contrast, a space in which the relative rotational phase is displaced in the retarding direction Sb by supplying the hydraulic oil is the retarded angle chamber Cb. In a state where the vane portion 32 reaches an operation end of the advancing direction Sa (including a phase of the vane portion 32 in the vicinity of the operation end of the advancing direction Sa), the relative rotational phase is referred to as the most advanced angle phase. In a state where the vane portion 32 reaches an operation end of the retarding direction Sb (including a phase of the vane portion 32 in the vicinity of the operation end of the retarding direction Sb), the relative rotational phase is referred to as the most retarded angle phase.

A retarded angle flow passage 33 communicating with the retarded angle chamber Cb and an advanced angle flow passage 34 communicating with the advanced angle chamber Ca are formed in the inner rotor body 31. In addition, the retarded angle flow passage 33 communicates with the lock recessed portion 28.

In the valve opening and closing timing control device A, when the hydraulic oil is supplied on the retarded angle chamber Cb in a case where the lock mechanism L is in a locked state, the hydraulic oil is supplied on the lock recessed portion 28 via the retarded angle flow passage 33. Therefore, the lock member 25 is disengaged from the lock recessed portion 28 against the biasing force of the lock spring 27 and the locked state is released. That is, in the embodiment, the engine E is started in a state of being locked in the most advanced angle phase, the hydraulic oil is supplied on the retarded angle chamber Cb and the lock recessed portion 28, a hydraulic pressure is ensured against the biasing force of the lock spring 27, and then the lock is released and the relative rotational phase is controlled to be a desired phase.

Electromagnetic Control Valve and Oil Passage Configuration

As illustrated in FIG. 1, the electromagnetic control valve 50 is configured of the spool 51, the spool spring, and an electromagnetic solenoid 54. That is, the spool 51 is slidably disposed in the inner space of the connecting bolt 38 in the direction of the rotational axis X and a stopper 53 made of a retaining ring for determining an operation position of the spool 51 on an outside end side thereof is provided in the connecting bolt 38. In addition, the spool spring exerts the biasing force in a direction (protruding direction) in which the spool 51 is separated from the intake camshaft 5.

The electromagnetic solenoid 54 includes a plunger 54a that protrudes by an amount proportional to power supplied on a solenoid on the inside thereof and the spool 51 is operated by a pressing force of the plunger 54a. In addition, the spool 51 is rotatably configured together with the inner rotor 30 and the electromagnetic solenoid 54 is non-rotatably configured by being supported on the engine E.

The electromagnetic solenoid 54 causes the plunger 54a to be disposed in a position that is able to abut against an outside end of the spool 51 and is held in a non-pressing position in a non-energized state, and the spool 51 is held in a retarded angle position. In addition, in a state where predetermined power is energized to the electromagnetic solenoid 54, the plunger 54a reaches a pressing position on an inside end side and the spool 51 is held in an advanced angle position. Furthermore, power which is lower than power that is set in the advanced angle position is energized to the electromagnetic solenoid 54. Therefore, a protruding amount of the plunger 54a is regulated and the spool 51 is held in a neutral position that is intermediate between the advanced angle position and the retarded angle position.

In addition, a flow passage for supplying a fluid on any one of the retarded angle flow passage 33 and the advanced angle flow passage 34 is formed on the inside of the connecting bolt 38 by the position of the spool 51 by controlling the fluid from the hydraulic pump P. Therefore, for example, in a case where the spool 51 is operated to the retarded angle position, is operated to the neutral position, and then is operated to the advanced angle position by the electromagnetic solenoid 54, accordingly, a state where the hydraulic oil is supplied from the hydraulic pump P to the retarded angle chamber Cb, a state where the supply and the discharge of the hydraulic oil is not performed, and a state where the hydraulic oil is supplied on the advanced angle chamber Ca are produced in this order. In the embodiment, a part of the retarded angle flow passage 33 is formed in the spring holder 41 which is described later and the inner rotor 30. That is, the spring holder 41 is effectively used and an axial length is reduced compared to a case where the retarded angle flow passage 33 is formed only in the inner rotor 30. In addition, since it is possible to form the retarded angle flow passage 33 by cutting a surface of the spring holder 41, it is easy to process.

Valve Opening and Closing Timing Control Device: Biasing Unit

As illustrated in FIGS. 1, 3 to 5, the biasing unit 40 is configured of the lid member 22 of the outer rotor 20, the spring holder 41 fixed to the inner rotor 30, and a torsion spring 46 supported by the spring holder 41. In addition, the spring holder 41 is omitted and the inner rotor 30 may be formed to protrude on the outside along the rotational axis X.

A restricting projection portion 22A that restricts the movement of the torsion spring 46 along the rotational axis X is formed to protrude from the outside surface in the lid member 22. That is, the restricting projection portion 22A is formed to protrude from a surface on a side opposite to the lock recessed portion 28 toward outside. Particularly, in the embodiment, the restricting projection portion 22A is formed to protrude from a portion which is positioned on the side opposite to the lock recessed portion 28 on the outside. Therefore, a thickness of the lock recessed portion 28 is increased and the strength of the lock recessed portion 28 is ensured such that the lock recessed portion 28 is not deformed even if the lock member 25 repeatedly abuts against the lock recessed portion 28. In addition, the lock recessed portion 28 may also be increased in hardness by being individually subjected to the thermal hardening treatment such as laser hardening. Therefore, with a simple and rapid method, the restricting projection portion 22A, which frequently comes into contact with the torsion spring 46, receives the influence of hardening of the lock recessed portion 28 and it is possible to increase the abrasion resistance of the restricting projection portion 22A. Moreover, the restricting projection portion 22A may be directly subjected to the thermal hardening treatment.

In addition, bolt insertion projection portions 22C as cylindrical boss portions having female threads, into which male threads of fastening bolts 24 inserted from a rear plate 23 side are screwed, inside surfaces thereof are integrally formed with the lid member 22 to protrude on the outside in the direction of the rotational axis X. In addition, an inner periphery guide portion 22B for guiding an inner peripheral portion of the torsion spring 46 is integrally formed with the lid member 22 on the inner periphery side of the lid member 22 to protrude on the outside in the direction of the rotational axis X. Moreover, the female threads on the inside surfaces of the bolt insertion projection portions 22C may be omitted. The inner periphery guide portion 22B is omitted and a protrusion portion 43 of the spring holder 41 which is described later may have the guide function.

The spring holder 41 is integrally formed with the seat portion 42 that is connected to the inner rotor body 31 and the protrusion portion 43 that is formed in a posture protruding from the seat portion 42 along the rotational axis X.

An insertion hole 42A into which the connecting bolt 38 is inserted is formed in a center position of the seat portion 42. In addition, an annular protrusion portion 42B, which is fitted into a fitting recessed portion 31A of the inner rotor 30, is annularly formed in a state of protruding on the outside in the radial direction of the seat portion 42. The annular protrusion portion 42B is interposed between the fitting recessed portion 31A of the inner rotor 30 and the lid member 22. Furthermore, a pin hole 42C of the seat portion 42 into which an alignment pin 44 press-fitted or clearance-fitted into the inner rotor 30 is fitted is formed on the inner rotor 30 side. Moreover, the annular protrusion portion 42B may be formed to protrude by being divided in the circumferential direction of the seat portion 42. In addition, the alignment pin 44 is omitted, a re-protrusion portion further protruding from the annular protrusion portion 42B on the outside in the radial direction of the seat portion 42 is provided, and the alignment may be performed by inserting the most protrusion portion into a portion in which a cutaway is formed on the outside of the fitting recessed portion 31A.

In a state where the alignment pin 44 fixed to the inner rotor 30 is aligned in the pin hole 42C of the seat portion 42, the annular protrusion portion 42B of the spring holder 41 is fitted into the fitting recessed portion 31A of the inner rotor 30. In the configuration, in a state where the annular protrusion portion 42B is fitted into the fitting recessed portion 31A, the state of being fitted is in an extent that each relative rotation is permitted and each rotation is restricted by fitting the alignment pin 44 into the pin hole 42C of the seat portion 42.

A fitting portion 43A which is a recessed space supporting one end portion of the torsion spring 46 is formed to be cut in the protrusion portion 43.

The torsion spring 46 includes a coil portion 46A which is disposed in a region surrounding an outer peripheral portion of the spring holder 41, a first arm 46B (one end portion) which extends from an outside end position on the outside in the direction of the rotational axis X in the coil portion 46A, and a second arm 46C (other end portion) which extends from the outside end position on the outside in the radial direction.

As illustrated in FIG. 5, a through-hole 22D having an inner diameter which is slightly greater than an outer periphery diameter D2 of the protrusion portion 43 and is a hole diameter D1 (inner diameter) around the rotational axis X is formed in a center position of the lid member 22. The outermost peripheral edge of the protrusion portion 43 is the outer periphery diameter D2 when viewed in the direction of the rotational axis X. Moreover, an inner diameter of the coil portion 46A of the torsion spring 46 is set to a value which is sufficiently greater than the outer periphery diameter D2.

An outside end diameter D3 of an outer peripheral edge of the annular protrusion portion 42B is set to be greater than the hole diameter D1 when viewed in the direction of the rotational axis X. In addition, an inner periphery diameter D4 of the fitting recessed portion 31A of the inner rotor body 31 is set to a value which is slightly greater than the outside end diameter D3. The fitting recessed portion 31A of the inner rotor body 31 is formed in a state of hollowing a region with respect to an outside end surface on the lid member 22 side around the rotational axis X. Therefore, the protrusion portion 43 of the outer periphery diameter D2 is able to be inserted into the through-hole 22D of the hole diameter D1. In addition, the protrusion portion 42B having the outside end diameter D3 which is greater than the hole diameter D1 of the through-hole 22D is held in a state of being retained with respect to the lid member 22. Furthermore, the annular protrusion portion 42B having the outside end diameter D3 is able to be fitted into the fitting recessed portion 31A having the inner periphery diameter D4.

The inner periphery guide portion 22B by which the inner peripheral portion of the coil portion 46A of the torsion spring 46 is guided is disposed in a circumferential region surrounding the through-hole 22D on an outer wall of the lid member 22. A plurality (four in the embodiment) of cylindrical bolt insertion projection portions 22C (an example of the bolt fastening portion and the outer periphery guide portion) are provided on the outer periphery side from the inner periphery guide portion 22B in the circumferential direction. The second arm 46C of the torsion spring 46 is engaged with one of the bolt insertion projection portions 22C. That is, the torsion spring 46 is engaged with the bolt insertion projection portion 22C of the lid member 22 and the fitting portion 43A of the spring holder 41 fixed to the inner rotor 30, and causes the biasing force to act on the outer rotor 20 and the inner rotor 30.

In addition, the inside of the plurality of bolt insertion projection portions 22C functions as the outer periphery guide portion by which the outer peripheral portion of the coil portion 46A of the torsion spring 46 is guided. Moreover, the plurality of bolt insertion projection portions 22C are not disposed in the circumferential direction, but may be disposed in positions of which distances from the center of the lid member 22 in the radial direction are different from each other. In this case, the inside of at least one of the plurality of bolt insertion projection portions 22C functions as the outer periphery guide portion for guiding the outer peripheral portion of the torsion spring 46.

Figure 3:
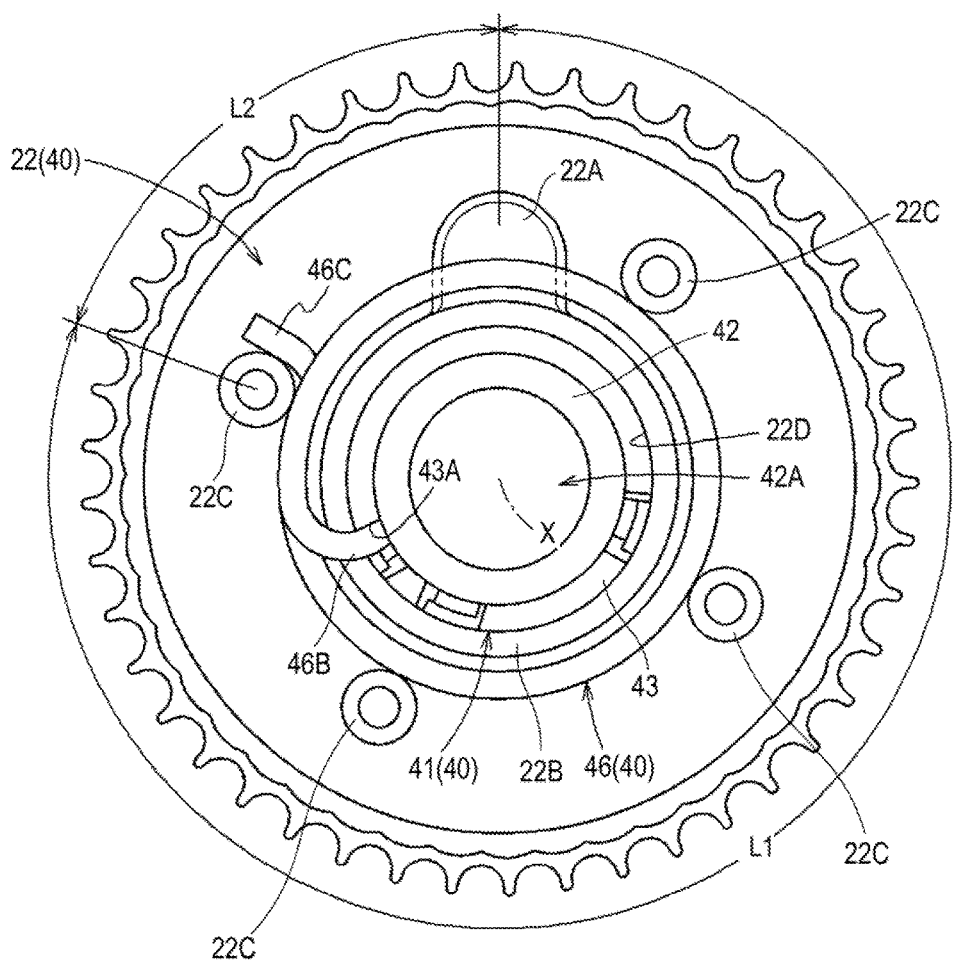
FIG. 3 is a view of the valve opening and closing timing control device that is viewed on a front plate side.
Figure 4:
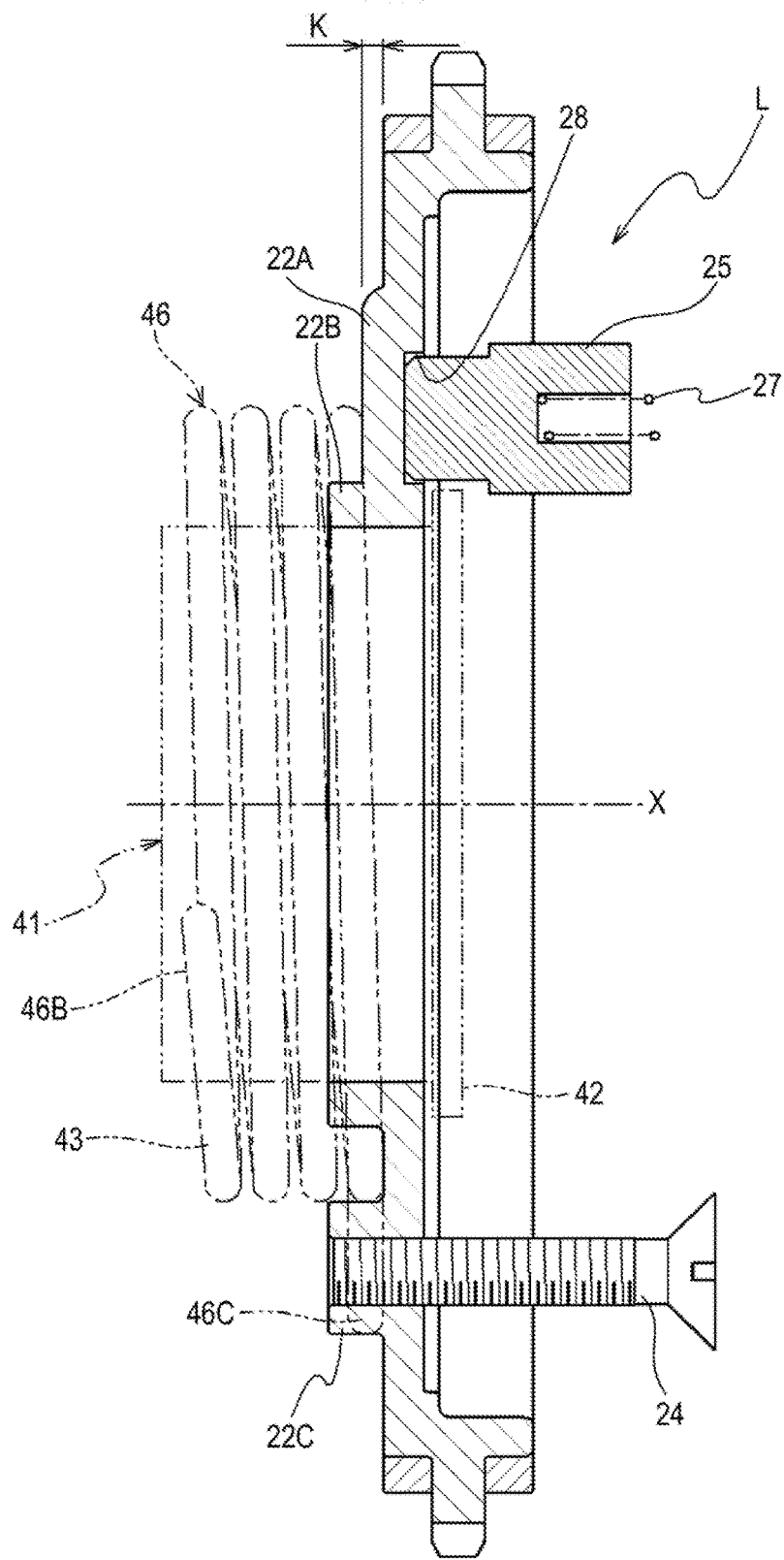
FIG. 4 is a sectional view of a torsion spring and the front plate.

As illustrated in FIG. 3, the restricting projection portion 22A is disposed between the bolt insertion projection portion 22C as an engaging portion which is engaged with the torsion spring 46 and another bolt insertion projection portion 22C in the circumferential direction. Particularly, the restricting projection portion 22A is configured such that a distance L1 in the circumferential direction from the engaging portion of the bolt insertion projection portion 22C of the torsion spring 46 to the restricting projection portion 22A in the unwinding direction of the torsion spring 46 is greater than a distance L2 in the circumferential direction from the bolt insertion projection portion 22C to the restricting projection portion 22A in a direction opposite to the unwinding direction of the torsion spring 46. That is, as illustrated in FIG. 4, the restricting projection portion 22A is formed to protrude corresponding to a space K with the lid member 22 that is generated as being oriented in the unwinding direction of the torsion spring 46 from the bolt insertion projection portion 22C.

Assembly of Biasing Unit

As illustrated in FIGS. 1 and 5, the rear plate 23 is disposed in a rear portion of the outer rotor body 21, the inner rotor body 31, on which the lock mechanism L and the alignment pin 44 are mounted, is fitted into the inside of the outer rotor body 21, and the spool 51 and the like are housed on the inside of the connecting bolt 38.

Next, in a state where the pin hole 42C of the seat portion 42 of the spring holder 41 is aligned to the alignment pin 44 fixed to the inner rotor 30 while inserting the protrusion portion 43 of the spring holder 41 into the through-hole 22D of the lid member 22 from a rear surface side, the seat portion 42 of the spring holder 41 is fitted into the fitting recessed portion 31A of the inner rotor body 31. Therefore, the outside end edges of a plurality of seat portions 42 are in contact with the circumferential inner peripheral surface of the fitting recessed portion 31A, and the alignment is performed so as to retain a position of the center of gravity of the spring holder 41 in the position of the rotational axis X. The inner rotor 30 and the spring holder 41 reach an integrally rotatable state.

Next, the lid member 22, the outer rotor body 21, and the rear plate 23 are connected by the fastening bolts 24. Furthermore, the connecting bolt 38 is inserted into the insertion hole 42A of the seat portion 42 of the spring holder 41 and fastening is performed by screwing the male threaded portion 38S of the connecting bolt 38 into the female threaded portion of the intake camshaft 5.

Therefore, the intake camshaft 5, the inner rotor 30, and the spring holder 41 are integrated. In this state, the outer periphery of the through-hole 22D of the lid member 22 presses against the seat portion 42 of the spring holder 41 and lifting of the spring holder 41 is prevented.

Next, the second arm 46C of the torsion spring 46 is engaged with the bolt insertion projection portion 22C of the lid member 22 while inserting a part of the coil portion 46A into the inner periphery guide portion 22B of the lid member 22. Furthermore, the first arm 46B of the torsion spring 46 is fitted into the fitting portion 43A of the protrusion portion 43 and is held, and thereby the valve opening and closing timing control device A is completed.

In this completed state, the torsion spring 46 of the biasing unit 40 is in a state of the most expanded diameter and causes the biasing force to act on the outer rotor 20 to displace the inner rotor 30 in the advancing direction Sa. In addition, the inner peripheral portion of the coil portion 46A of the torsion spring 46 is guided by the inner periphery guide portion 22B of the lid member 22 and the outer peripheral portion of the coil portion 46A is guided by the plurality of bolt insertion projection portions 22C (outer periphery guide portion). Therefore, the movement in the radial direction is guided by the contraction and expansion of the diameter of the torsion spring 46. Furthermore, an inclination in the direction of the rotational axis X caused by the contraction of the diameter of the torsion spring 46 is blocked by the restricting projection portion 22A of the lid member 22.

Operations and Effects of Embodiment

As described above, since the biasing unit 40 is provided on the outside of the body portion (phase control mechanism) configured of the outer rotor 20 and the inner rotor 30, reduction of the body portion in size can be achieved. In addition, even if friction powder is generated by the torsion spring 46 being in contact with, for example, the lid member 22, friction powder does not enter the inside of the body portion and the relative rotation between the outer rotor 20 and the inner rotor 30 is not hindered by biting of friction powder. Furthermore, since the torsion spring 46 may be provided after the body portion is assembled, the assembly of the torsion spring 46 is extremely facilitated.

Since the restricting projection portion 22A of the lid member 22 is provided on the outside of the lock recessed portion 28, when the inclination with respect to the rotational axis X is generated as the axial length is extended by the contraction of the diameter of the torsion spring 46, the restricting projection portion 22A abuts against the torsion spring 46 and thereby it is possible to correct the inclination. As a result, since the outer rotor 20 and the inner rotor 30 are not relatively inclined and the posture is stable, the device performance is not lowered. In addition, in order to prevent deformation when the lock member 25 is engaged, the thickness is ensured by making the lock recessed portion 28 protrude to the outside of the lid member 22 and the protrusion portion is efficiently used as the restricting projection portion 22A. As a result, the thickness of the entire lid member 22 is not wastefully large and the valve opening and closing timing control device A can be compacted.

Furthermore, the torsion spring 46 is guided by being interposed between the inner periphery guide portion 22B of the lid member 22 and the plurality of bolt insertion projection portions 22C. Therefore, the movement of the torsion spring 46 in the radial direction is also appropriate and the posture of the torsion spring 46 is reliably stabilized coupled with the inclination prevention function of the restricting projection portion 22A. The inner periphery guide portion 22B and the plurality of bolt insertion projection portions 22C are formed only by forming the lid member 22 to protrude. Therefore, processing is facilitated and there is no inconvenience that the inner rotor 30 is worn by the contact between the torsion spring 46 and the inner rotor 30.

In a case where the thermal hardening treatment is performed separately to the lock recessed portion 28 positioned on the side opposite to the restricting projection portion 22A, it is possible to increase durability against local wear due to a point contact between the restricting projection portion 22A and the torsion spring 46.

The spring holder 41 is configured to be aligned to the inner rotor 30 by the alignment pin 44 rather than press-fit into the inner rotor 30. Therefore, the device performance is not lowered without deforming the inner rotor 30. Furthermore, for example, it is necessary to increase the strength in the fitting portion to directly fit one end of the torsion spring 46 into the inner rotor 30. In contrast, it is not necessary to increase the strength of the inner rotor 30 by using the spring holder 41. On the other hand, when the other end of the torsion spring 46 is fitted into the outer rotor 20, the bolt insertion projection portions 22C for screwing the fastening bolts 24 are used. Therefore, the strength of the fitting portion is increased by the high strength of the bolts. Thus, it is not necessary to separately provide a pin-like hook and the like, and it is efficient.

The restricting projection portion 22A is provided adjacent to the bolt insertion projection portion 22C as the engaging portion for engaging the other end of the torsion spring 46. Therefore, the space K separated from the lid member 22 formed as being oriented in the unwinding direction of the torsion spring 46 from the bolt insertion projection portion 22C is efficiently used. As a result, it is not necessary to separately provide a space in the direction of the rotational axis X for forming the restricting projection portion 22A and it is possible to reduce the axial length of the valve opening and closing timing control device A. In addition, the outside surface of the lid member 22 and the torsion spring 46 are in contact with each other in a unwinding start region of the torsion spring 46 and the restricting projection portion 22A is in contact with the torsion spring 46 to compensate for the separation space K in a region positioned on a side opposite to the unwinding start region in the radial direction. That is, two regions of the torsion spring 46 facing each other in the radial direction are in contact with the lid member 22. Therefore, the inclination due to the contraction and expansion of the diameter of the torsion spring 46 is prevented and it is possible to reliably stabilize the posture of the torsion spring 46.

In addition, in the valve opening and closing timing control device A having such a configuration, for example, the hydraulic oil is leaked from the through-hole 22D of the lid member 22 to the outside, but it is possible to suppress the wear of the torsion spring 46, the lid member 22, and the like by the hydraulic oil.

Other Embodiments

The following configurations may be provided in addition to the embodiment described above. Moreover, to facilitate understanding of the figures, the same members will be described with the same names and numbers.

Figure 6:
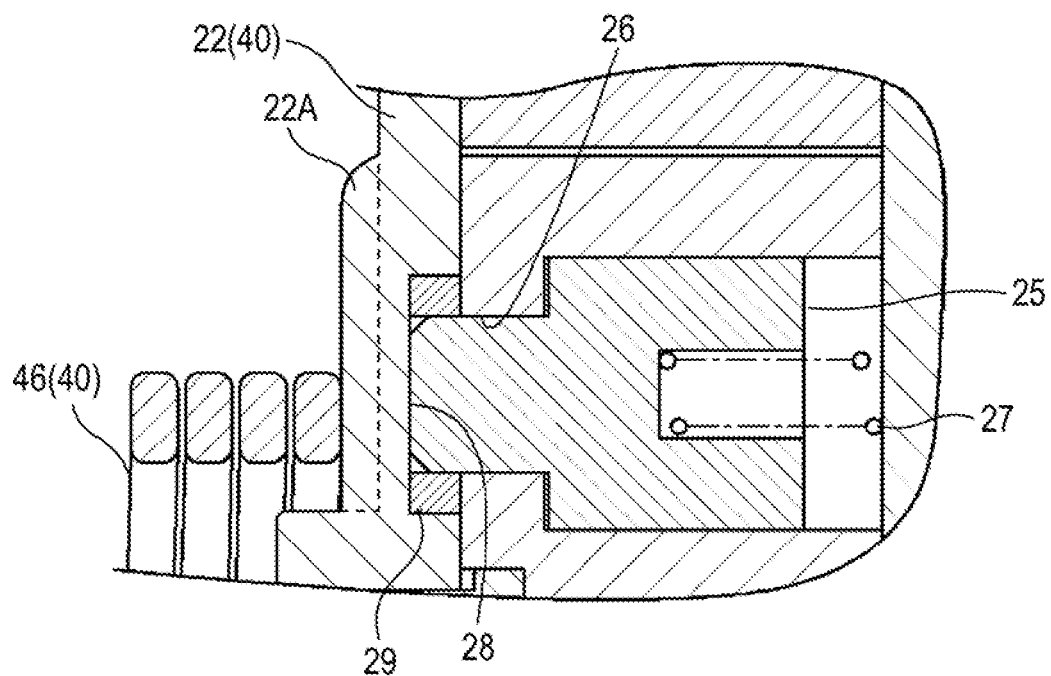
FIG. 6 is a sectional view illustrating a cylindrical member of another embodiment (a)

(a) As illustrated in FIG. 6, a cylindrical member 29 having a cylindrical shape may be fitted into the inside surface of the lock recessed portion 28. Therefore, the cylindrical member 29 also functions as a reinforcing member of the restricting projection portion 22A. As a result, even if a weight is applied as the diameter of the torsion spring 46 is contracted, the restricting projection portion 22A is prevented from being deformed and it is possible to stabilize the posture of the torsion spring 46 for a long period of time. In addition, the deformation of the lock recessed portion 28 on the side opposite to the restricting projection portion 22A is also prevented. Therefore, fitting accuracy of the lock member 25 is not lowered. Moreover, the cylindrical member 29 may be configured with a U-shaped cross-section and the like having a bottom portion in addition to a structure abutting against a side wall of the lock recessed portion 28 and is not particularly limited as long as the shape can reinforce the restricting projection portion 22A.

Figure 7:
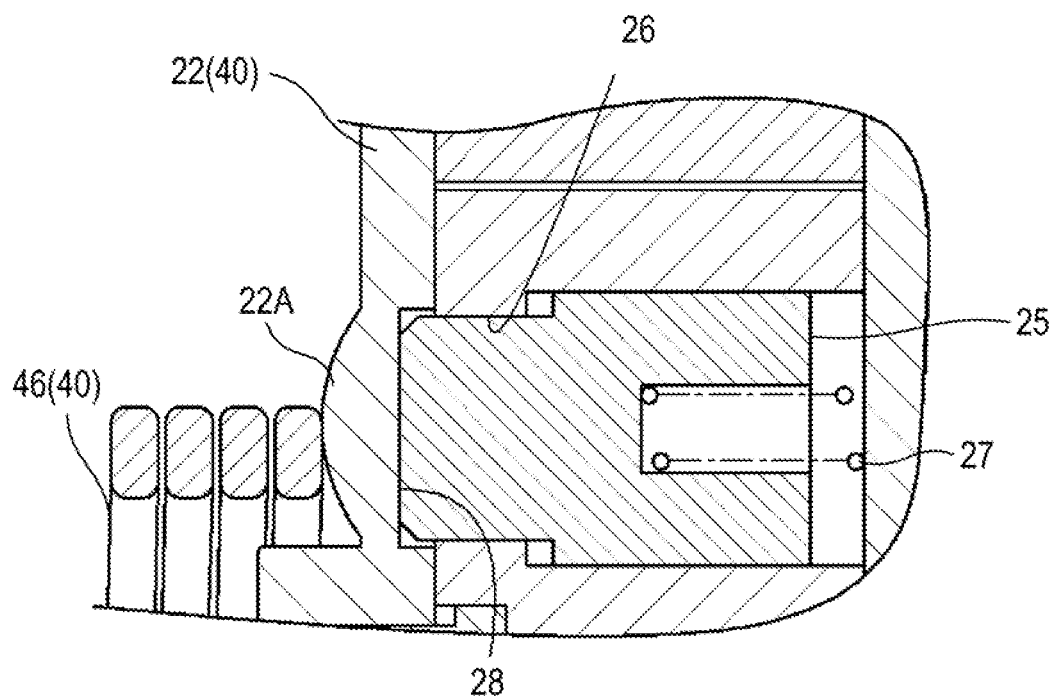
FIG. 7 is a sectional view illustrating a restricting projection portion of another embodiment (b).

(b) As illustrated in FIG. 7, the surface of the restricting projection portion 22A may be formed in an arc-shaped cross-section and the like, and the shape of the restricting projection portion 22A is not particularly limited. As described above, if the surface of the restricting projection portion 22A is a curved surface, it is possible to expect an effect that a friction force between the restricting projection portion 22A and the torsion spring 46 can be reduced and to reduce movement resistance of the torsion spring 46. Therefore, operability of the inner rotor 30 is improved.

(c) The lid member 22 of the outer rotor 20 on the side on which the torsion spring 46 is provided may be configured by the sintered workpiece or the die-casting workpiece. According to such a configuration, since countless numbers of extremely small voids exist on the inside of the lid member 22, the hydraulic oil is exuded from the fluid pressure chamber C. As a result, it is possible to suppress wear caused by contact between the torsion spring 46 and the lid member 22. Moreover, in order to facilitate exuding of the hydraulic oil, fine through-holes may be formed in the restricting projection portion 22A.

(d) In the embodiment described above, the restricting projection portion 22A is formed to protrude from a portion of the lid member 22 which is positioned on the side opposite to the lock recessed portion 28 on the outside, but may be formed to protrude from the outside surface which does not include the portion of the lid member 22 which is positioned on the side opposite to the lock recessed portion 28 on the outside.

(e) In the embodiment described above, the plurality of bolt insertion projection portions 22C are integrally formed with the lid member 22 to protrude on the outside in the direction of the rotational axis X and the second arm 46C of the torsion spring 46 is engaged with one of the bolt insertion projection portions 22C (engaging portions). Alternately, the head portion of the fastening bolt 24 is set to the bolt fastening portion (engaging portion) and may be engaged with the second arm 46C of the torsion spring 46. The second arm 46C of the torsion spring 46 may be directly engaged with the male threads of the fastening bolt 24.

(f) In the embodiment described above, the torsion spring 46 is disposed on the outside of the lid member 22, but may be disposed on the outside of the rear plate 23 as the lid member. In this case, since the configuration of the lid member 22 is applied to the rear plate 23 with back and forth symmetry, detailed description thereof will be omitted.

The embodiments disclosed here can be used in the valve opening and closing timing control device including a mechanism for biasing the relative rotational phase between the driving-side rotating body and the driven-side rotating body in a predetermined direction.

A feature of a valve opening and closing timing control device according to an aspect of this disclosure resides in that the device includes a driving-side rotating body that is synchronously rotated with a crankshaft of an internal combustion engine and has a lid member fixed in a direction of the rotational axis; a driven-side rotating body that is integrally rotated with a camshaft for opening and closing a valve on the same rotational axis; a lock mechanism that has a lock member moving in the direction of the rotational axis and a lock recessed portion which is formed inside the lid member and into which the lock member is able to be fitted; and a torsion spring that is disposed outside the lid member and exerts a biasing force to the driving-side rotating body and the driven-side rotating body, in which a restricting projection portion for restricting a movement of the torsion spring in the direction of the rotational axis is formed to protrude from a side opposite to the lock recessed portion in the lid member.

In this configuration, if the torsion spring is disposed outside the driving-side rotating body (lid member), friction powder does not enter the inside of the device even if friction powder is generated due to contact between the driving-side rotating body or the driven-side rotating body and the torsion spring. Therefore, a smooth relative rotation between the driving-side rotating body and the driven-side rotating body is not inhibited by biting of friction powder and device performance is not lowered. In addition, since the torsion spring is positioned on the outside, it is possible to provide the torsion spring after assembling the driven-side rotating body and the driving-side rotating body and it can be easily assembled.

Particularly, in the configuration, since the restricting projection portion for restricting the movement of the torsion spring in the direction of the rotational axis is provided in the lid member, the restricting projection portion abuts against the torsion spring when the torsion spring is contracted or expanded in diameter and it is possible to stabilize a posture of the torsion spring by correcting an inclination of the torsion spring. As a result, since the driving-side rotating body and the driven-side rotating body are not relatively inclined, device performance is not lowered. In addition, since the restricting projection portion is configured to be formed to protrude from the surface of the lid member, processing is extremely easy. As described above, it is possible to provide the valve opening and closing timing control device which can stabilize the posture of the torsion spring with a simple configuration without lowering the device performance.

As another configuration, the restricting projection portion may be provided in a portion that is positioned on the side opposite to the lock recessed portion in the lid member.

In order to ensure the strength of the lock recessed portion, it is necessary to ensure a thickness by making the position which is positioned on the side opposite to the lock recessed portion in the lid member protrude to the outside. However, as in the configuration, if the restricting projection portion is formed in the portion which is positioned on the side opposite to the lock recessed portion, it is possible to effectively use the protrusion portion as the restricting projection portion. As a result, a thickness of an entire lid member is not wastefully large and a shape of the lid member is also not complicated.

As another configuration, the lock recessed portion may be subjected separately to a thermal hardening treatment.

Since the surface of the restricting projection portion is always rubbed by the torsion spring, it readily becomes locally worn. Therefore, as in the configuration, if the lock recessed portion is subjected to the thermal hardening treatment, it is possible to improve abrasion resistance of the restricting projection portion on the side opposite to the lock recessed portion under effect of hardening and to stabilize the posture of the torsion spring for a long period of time.

As another configuration, a cylindrical member may be fitted into an inside of the lock recessed portion.

As in the configuration, the lock recessed portion that is relatively thin in the lid member is reinforced by the cylindrical member by providing the cylindrical member in the lock recessed portion. As a result, even if a weight is received in accordance with reduction of the torsion spring in diameter, deformation of the restricting projection portion on the side opposite to the lock recessed portion is prevented and it is possible to stabilize the posture of the torsion spring for a long period of time. In addition, since the deformation of the lock recessed portion on the side opposite to the restricting projection portion is also prevented, fitting accuracy of the lock member is not lowered.

As another configuration, the lid member may be configured by a sintered workpiece or a die-casting workpiece.

In general, a fluid pressure chamber to which a hydraulic oil is supplied is disposed between the driven-side rotating body and the driving-side rotating body. As in the configuration, if the lid member is configured by the sintered workpiece or the die-casting workpiece, and countless numbers of extremely small voids exist on an inside thereof, the hydraulic oil between the driving-side rotating body and the driven-side rotating body is exuded on an outside surface side of the lid member. As a result, it is possible to suppress wear caused by contact between the torsion spring and the lid member.

As another configuration, an end portion of the torsion spring may be engaged with one position on bolt fastening portions of the lid member in which a plurality of bolts inserted into the driving-side rotating body in the direction of the rotational axis are positioned.

As in the configuration, if the end portion of the torsion spring is engaged with one position on the bolt fastening portions of the lid member in which the bolts fastening the lid member and another member are positioned, it is not necessary to provide the pin-like hook as in Reference 2 and a compact device is achieved. In addition, since the bolts are inserted into the bolt fastening portions, durability is increased by the high strength of the bolts.

As another configuration, the bolt fastening portion may be configured of a cylindrical boss portion integrally formed to protrude with the lid member in the direction of the rotational axis.

According to the configuration, the bolt fastening portion is configured of the cylindrical boss portion integrally formed to protrude with the lid member. Therefore, it is possible to facilitate processing and reduce a manufacturing cost. In addition, it is possible to increase a force with which the torsion spring engages by the bolt fastening portions integrally formed to protrude with the lid member in addition to the high strength of the bolts.

As another configuration, a distance in a circumferential direction from an engaging portion of the torsion spring of the bolt fastening portion to the restricting projection portion of the torsion spring in a unwinding direction may be greater than a distance in the circumferential direction from the bolt fastening portion to the restricting projection portion in a direction opposite to the unwinding direction.

The torsion spring is separated from the outside surface of the lid member when advancing in the unwinding direction from the bolt fastening portion. Thus, as in the configuration, if the projection portion is formed in a position which is separated from the bolt fastening portion with which the end portion of the torsion spring is engaged in the circumferential direction in the unwinding direction, that is, at a position of approach in a direction opposite to the unwinding direction, it is possible to efficiently use a separation space between the torsion spring and the outside surface of the lid member. As a result, it is not necessary to separately ensure a space in an axial direction for forming the projection portion and it is possible to make the device compact by reducing an axial length of the device.

In addition, the outside surface of the lid member and the torsion spring are in contact with each other in a unwinding start region of the torsion spring and the restricting projection portion of the lid member is in contact with the torsion spring to compensate for the separation space in a region positioned on a side opposite to the unwinding start region in a radial direction. That is, two regions of the torsion spring facing each other in the radial direction are in contact with the lid member. Therefore, it is possible to reliably stabilize the posture of the torsion spring.

As another configuration, an outer periphery guide portion for guiding an outer peripheral portion of the torsion spring may be provided in at least one position on the bolt fastening portions of the lid member.

In the configuration, the outer peripheral portion of the torsion spring is able to be guided by the outer periphery guide portion of the bolt fastening portion. Therefore, it is possible to reliably stabilize the posture of the torsion spring. In addition, if the bolt fastening portion is utilized as the outer periphery guide portion, it is not necessary to separately provide a guide member and this is efficient.

As another configuration, an inner periphery guide portion for guiding an inner peripheral portion of the torsion spring may be integrally formed to protrude with the lid member in the direction of the rotational axis in the lid member.

As in the configuration, if the inner periphery guide portion is provided in the lid member, it is not necessary to provide the inner periphery guide portion for guiding the inner peripheral portion of the torsion spring in the driven-side rotating body and the driven-side rotating body does not wear. As a result, the device performance is not degraded. In addition, since the lid member is formed to protrude, it is easily processed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A valve opening and closing timing control device comprising:
   a driving-side rotating body that is synchronously rotated with a crankshaft of an internal combustion engine and has a lid member fixed in a direction of a rotational axis;
   a driven-side rotating body that is integrally rotated with a camshaft for opening and closing a valve on a same rotational axis;
   a lock mechanism that has a lock member moving in the direction of the rotational axis and a lock recessed portion which is formed inside the lid member and into which the lock member is able to be fitted; and
   a torsion spring that is disposed outside the lid member and exerts a biasing force to the driving-side rotating body and the driven-side rotating body,
   wherein a restricting projection portion for restricting a movement of the torsion spring in the direction of the rotational axis is formed to protrude from a side opposite to the lock recessed portion in the lid member, the restricting projection portion being provided in a portion that is positioned on the side opposite to the lock recessed portion in the lid member,
   the torsion spring is engaged with an engaging portion which is integrally formed with the lid member to protrude on an outside in the direction of the rotational axis from the lid member,
   the restricting projection portion is formed to protrude corresponding to a space generated between the torsion spring and the lid member from the engaging portion in an unwinding direction of the torsion spring, and
   the restricting projection portion is in contact with the torsion spring in the direction of the rotational axis.

2. The valve opening and closing timing control device according to claim 1, wherein the lock recessed portion is subjected separately to a thermal hardening treatment.

3. The valve opening and closing timing control device according to claim 2, wherein a cylindrical member is fitted into an inside of the lock recessed portion.

4. The valve opening and closing timing control device according to claim 2, wherein the lid member is configured by a sintered workpiece or a die-casting workpiece.

5. The valve opening and closing timing control device according to claim 2, wherein an end portion of the torsion spring is engaged with one of a plurality of bolt fastening portions of the lid member in which a plurality of bolts inserted into the driving-side rotating body in the direction of the rotational axis are positioned.

6. The valve opening and closing timing control device according to claim 5, wherein the plurality of bolt fastening portions are each configured of a cylindrical boss portion integrally formed to protrude with the lid member in the direction of the rotational axis.

7. The valve opening and closing timing control device according to claim 2, wherein a distance in a circumferential direction from the engaging portion to the restricting projection portion in the unwinding direction is greater than a distance in the circumferential direction from the engaging portion to the restricting projection portion in a direction opposite to the unwinding direction.

8. The valve opening and closing timing control device according to claim 1, wherein a cylindrical member is fitted into an inside of the lock recessed portion.

9. The valve opening and closing timing control device according to claim 1, wherein the lid member is configured by a sintered workpiece or a die-casting workpiece.

10. The valve opening and closing timing control device according to claim 1, wherein an end portion of the torsion spring is engaged with one of a plurality of bolt fastening portions of the lid member in which a plurality of bolts inserted into the driving-side rotating body in the direction of the rotational axis are positioned.

11. The valve opening and closing timing control device according to claim 10, wherein the plurality of bolt fastening portions are each configured of a cylindrical boss portion integrally formed to protrude with the lid member in the direction of the rotational axis.

12. The valve opening and closing timing control device according to claim 10, wherein an outer periphery guide portion for guiding an outer peripheral portion of the torsion spring is provided in at least one of the plurality of bolt fastening portions of the lid member.

13. The valve opening and closing timing control device according to claim 1, wherein a distance in a circumferential direction from the engaging portion to the restricting projection portion in the unwinding direction is greater than a distance in the circumferential direction from the engaging portion to the restricting projection portion in a direction opposite to the unwinding direction.

14. The valve opening and closing timing control device according to claim 1, wherein an inner periphery guide portion for guiding an inner peripheral portion of the torsion spring is integrally formed to protrude with the lid member in the direction of the rotational axis in the lid member.

* * * * *